A. SAUNDERS.
PIPE CUTTER.

No. 176,815.  Patented May 2, 1876.

Witnesses:
W. M. Edwards
H. Wells Jr.

Inventor:
Andrew Saunders
per James A. Whitney
Atty.

UNITED STATES PATENT OFFICE.

ANDREW SAUNDERS, OF YONKERS, NEW YORK, ASSIGNOR TO D. SAUNDERS' SONS, OF SAME PLACE.

IMPROVEMENT IN PIPE-CUTTERS.

Specification forming part of Letters Patent No. 176,815, dated May 2, 1876; application filed September 29, 1875.

*To all whom it may concern:*

Be it known that I, ANDREW SAUNDERS, of Yonkers, in the county of Westchester and State of New York, have invented certain Improvements in Pipe-Cutters, of which the following is a specification.

The object of this invention is to provide a pipe-cutter that, aside from its durability, strength, and convenience of manufacture and use, shall possess the advantages of being capable of cutting pipes of widely-varying diameters, of cutting them squarely off without leaving any bur at the edges, of cutting as close to the end as circumstances may, in any case, require, and, moreover, incapable of slipping longitudinally upon the pipe during the operation of cutting the same.

The invention consists in a circumferential rib provided upon one of the anti-friction-rollers of a pipe-cutter, in such manner that, when the implement is in use, the said rib will circumferentially indent the outer surface of the pipe, and follow in said indentation during the operation of cutting, thereby preventing any slipping of the implement upon the pipe, and providing for the accurate action of the cutter thereon. The invention further comprises a novel and peculiar combination of a movable jaw, carrying a friction-roller at its outer end or apex, with a triangularly-recessed fixed jaw, provided at each side of its recess with two or more rollers, whereby the roller of the movable jaw is fitted for passage into the aforesaid recess of the fixed jaw, in order to grasp and hold any diameter of pipe required during the cutting operation. The invention further consists in a novel combination of a cutter, actuated by one handle of the implement, with a fixed jaw recessed for the reception of the pipe while being cut, and a movable jaw actuated by the other handle, whereby provision is made for cutting the pipe without leaving any bur upon the cut end thereof after cutting as aforesaid. The invention further comprises the combination, in the open-jawed pipe-cutter, of a movable cutter provided in a recess in the side of the cutter-stock, and in a plane passing by the ends of the rollers of the fixed jaw, whereby the implement is made capable of cutting pipes close to the extreme ends thereof, cleanly and symmetrically, and without any necessity of extra or unusual care or skill. The invention further comprises a novel combination of parts whereby, when occasion requires, the cutter may be readily detached from the implement for sharpening and as readily replaced for use.

Figure 1:
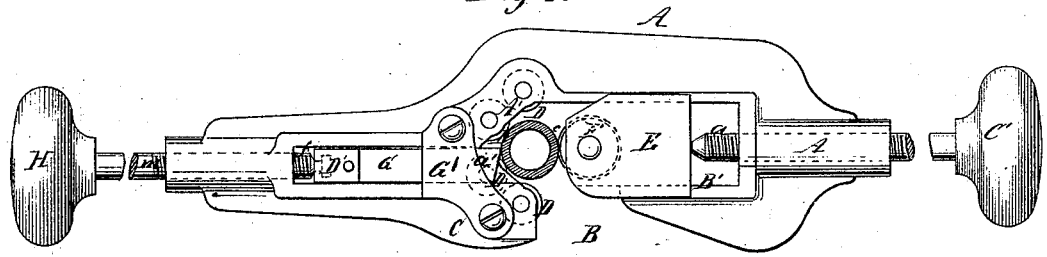
Figure 2:
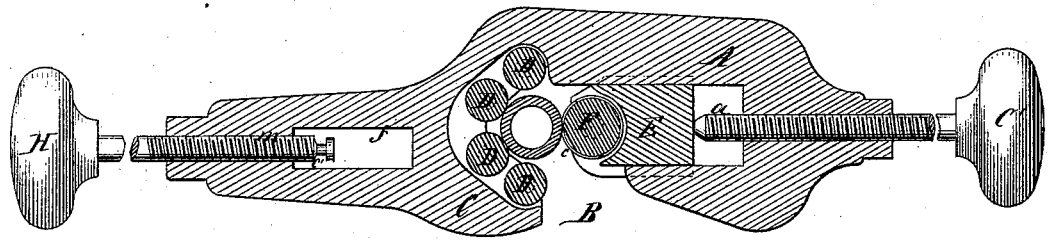
Figure 3:
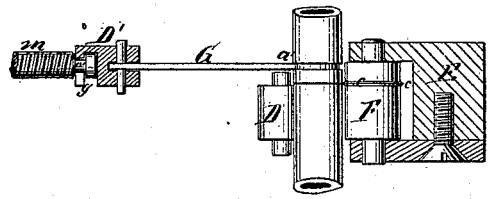

Figure 1 is a side view of a pipe-cutter made according to my invention. Fig. 2 is a longitudinal section of the same. Fig. 3 is a detached detail view of one portion of the same.

A is the cutter-stock, made of metal, cast or malleable, open at one side, as shown at B, and having formed solid or in one with it the fixed jaw C, having a triangular recess, A'. The jaw at each side of the recess is hollowed out for the reception of anti-friction rollers D, the inner sides of which project into the said recess more or less, and which are arranged two on each sides, so that the rollers, in their arrangement, conform to the triangular shape of the recess, as will be seen by reference to Fig. 1. More than two rollers on each side may be employed if desired, but the number represented on the drawings will, for all ordinary or practical purposes, be found sufficient. E is a movable jaw sliding in a guide, B', formed in the stock, capable of being moved inward by a screw, $a$, provided on the inner end of the handle C', and working through a nut provided in the end of the cutter-stock A. In the inner end of this movable jaw E is an anti friction roller, F, arranged coincident with the inner corner of the triangular recess A', so that when the movable jaw is moved inward it may pass as far into the said recess as may be required to clasp the pipe to be cut between the friction-roller F in the said movable jaw and those, D, which line the sides of the said recess. On the roller F is a circumferential bead, rib, or ridge, $c$, the function of which is hereinafter explained. Provided longitudinally in one side of the cutter-stock A is a seat, recsss, or guide, $f$, in which is placed the sliding cutter G, the nose $a'$ of which is formed to cut a clean chip from the metal upon which it is made to act. This cutter is attached at its rear end to a head, D', which is formed, as represented in Fig. 3, with two lugs, $g$, which catch into a circumferential groove, $c'$, in the end of the screw $m$, which forms the innermost portion of the handle H, the said screw working in a nut provided in that end of the cutter-stock opposite that at which the other handle $C'$ is located, so that by turning the handle H in one direction or the other the cutter may be moved in or out, as the case may be, the inward thrust of the screw bearing upon the solid end of the head $D'$, the outward upon the lugs $g$. A plate, $G'$, is screwed fast across the seat or guide $f$, and serves to hold the cutter G in place.

In the use of the implement the pipe is placed between the jaws, being preferably passed thereto through the open side B of the cutter-stock. The handle $C'$ is then turned to clamp the pipe between the roller F of the movable jaw and the rollers D of the fixed jaw, until the rib or bead $c$ is brought into forcible contact with and pressure upon the pipe. This done, the implement is turned around the pipe, and the rib $c$ being forced into the outer surface thereof forms a groove therein, so that the roller F being tightened up to any requisite extent, the aforesaid bead rolls around in the groove thus formed in the circumference of the pipe during the subsequent cutting operation, and thereby prevents the implement from slipping longitudinally upon the pipe, thus preventing any side strain on the cutter, and insuring the most efficient action of the latter. The pipe, being thus brought between the roller of the movable jaw on the one side, and those of the fixed jaw on the other, affords a firm support for the implement around which it may be freely turned. During this axial turning motion of the implement, the cutter G is fed in by operating the handle H, the screw of which forces inward the cutter, as hereinbefore explained. The cutter, taking a clean chip, cuts off the pipe squarely and without burring or contracting its internal diameter at the severed end.

In order to remove the cutter for sharpening or replacement by another, it is only necessary to remove the plate $G'$, and the cutter may be lifted or taken out without further manipulation.

What I claim as my invention is—

1. The circumferential rib $c$, provided upon the anti-friction roller of a pipe-cutter, substantially as and for the purpose set forth.

2. In a pipe-cutter, the anti-friction roller F, provided on the movable jaw E, in combination with the triangular series of anti-friction rollers D, the roller F, being arranged in line with the apex of the recess formed by the series of rollers D, whereby the implement is enabled to operate with the same degree of steadiness on pipes of widely differing diameter, substantially as set forth.

3. The combination, in an open jawed pipe-cutter, of the movable cutter G, arranged in the recess or guide $f$ in the stock A, and in a plane passing by the ends of the rollers D, the whole arranged for use and operation substantially as and for the purpose set forth.

4. The combination of the head $D'$, constructed with the lugs $g$ and socket for securing the sliding cutter $a$, and actuating-handle H having the circumferential groove $c'$, substantially as and for the purpose set forth.

ANDREW SAUNDERS.

Witnesses:
 ALEX. SAUNDERS,
 WM. P. FITCH.